United States Patent
Asadi

(10) Patent No.: US 7,181,215 B2
(45) Date of Patent: *Feb. 20, 2007

(54) AUTOMATIC GPRS/EDGE RE-ATTACH

(75) Inventor: Mehrzad Asadi, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 29 days.

This patent is subject to a terminal disclaimer.

(21) Appl. No.: 10/711,599

(22) Filed: Sep. 28, 2004

(65) Prior Publication Data

US 2005/0272422 A1 Dec. 8, 2005

Related U.S. Application Data

(63) Continuation-in-part of application No. 10/709,857, filed on Jun. 2, 2004.

(51) Int. Cl.
H04Q 7/20 (2006.01)
(52) U.S. Cl. ............... 455/435.1; 455/432.2; 455/454; 455/452.2; 455/450; 455/452.1; 455/426.1; 455/525; 455/437; 370/338; 370/349
(58) Field of Classification Search ............. 455/435.1, 455/426.1, 437, 525, 454, 432.2, 452.2, 450, 455/452.1; 370/328, 329, 331–338, 348, 370/349
See application file for complete search history.

(56) References Cited

U.S. PATENT DOCUMENTS 5,862,482 A 1/1999 Beesley et al.
6,792,284 B1 * 9/2004 Dalsgaard et al. .......... 455/525
7,047,007 B1 * 5/2006 Asadi ....................... 455/435.1

OTHER PUBLICATIONS

Digital Cellular Telecommunications System (Phase 2+): Universal Mobile Radio Interface Layer 3 specification; Core network Protocols; Stage 3 (3GPP TS 24.008 version 5.10.0 Release 5); ETSI TS 124 008:, ETSI Standards, European Telecommunications Standards Institute, Sophia-Antipo, yr. 2003.
Sony Ericsson Mobile Communications AB, International Application Ser. No. PCT/US2006/011356, "International Search Report", Jul. 22, 2005.
Sony Ericsson Mobile Communications AB, International Application Ser. No. PCT/US2006/011356 ,"Written Opinion", Jul. 22, 2005.

* cited by examiner

Primary Examiner—Joseph Feild
Assistant Examiner—Pierre-Louis Desir
(74) Attorney, Agent, or Firm—Moore & Van Allen PLLC; Gregory A. Stephens

(57) ABSTRACT

The present invention describes a method of automatically re-establishing a GPRS/EDGE connection between a mobile station and a network following successful execution of a network detach request. The mobile station receives a detach_request from the network to terminate a current GPRS/EDGE connection between the mobile station and the network. The mobile station then terminates the GPRS/EDGE connection with the network pursuant to the received detach request. The mobile station then determines if the detach_type parameter associated with the detach_request is set to re-attach_not_required. If this is true, then the mobile station determines if the detach_cause parameter associated with the detach request contains a null value. If this is also true, then the mobile station monitors a timeout parameter. Upon expiration of the timeout parameter the mobile station automatically initiates a GPRS/EDGE re-attachment with the network.

9 Claims, 2 Drawing Sheets

AUTOMATIC GPRS/EDGE RE-ATTACH

CROSS REFERENCE TO RELATED APPLICATIONS

The present application is a continuation-in-part of co-pending application Ser. No. 10/709,857 filed Jun. 2, 2004.

BACKGROUND

Mobile station (MS) or mobile phone users increasingly rely on their mobile phones for their communication and organizational needs. Many of today's mobile phones are equipped to allow access to a wide variety of data services including e-mail and the Internet. The most prevalent cellular telephony standard is the Global System for Mobile Communications (GSM). Within the GSM standard, there are provisions for a variety of evolving data standards. One of the more popular data standards is the General Packet Radio Service (GPRS) and the Enhanced Data Rates for Global Evolution (EDGE) standard. GPRS and EDGE are popular because of their relatively high bandwidth characteristics that allow mobile phone users to send and receive data at or near broadband data rates between their mobile phones and a service provider's cellular network.

The GSM specification includes the GPRS/EDGE sub-specification that governs the procedures for attaching and detaching a mobile station (MS) with a cellular network. Within the GSM/GPRS/EDGE specification, however, there are scant provisions for automatic GPRS/EDGE reattachment of a mobile station to the network following a network detach request.

What is needed is a procedure that automatically allows the mobile phone to attempt to re-attach to GPRS/EDGE service after executing a network detach request.

SUMMARY

The present invention describes a method of automatically re-establishing a GPRS/EDGE connection between a mobile station and a network following a network detach request. The mobile station receives a detach_request from the network to terminate a current GPRS/EDGE connection between the mobile station and the network. The mobile station then terminates the GPRS/EDGE connection with the network pursuant to the received detach request. The mobile station then determines if the detach_type parameter associated with the detach_request is set to re-attach_not_required. If this is true, then the mobile station determines if the detach_cause parameter associated with the detach request contains a null value. If both these conditions are met, then the mobile station, without user intervention, will attempt to automatically initiate a GPRS/EDGE re-attachment with the network following a specified timeout period.

The method may also be implemented by software as a computer program product or as a system within the mobile phone.

DETAILED DESCRIPTION

Figure 1:
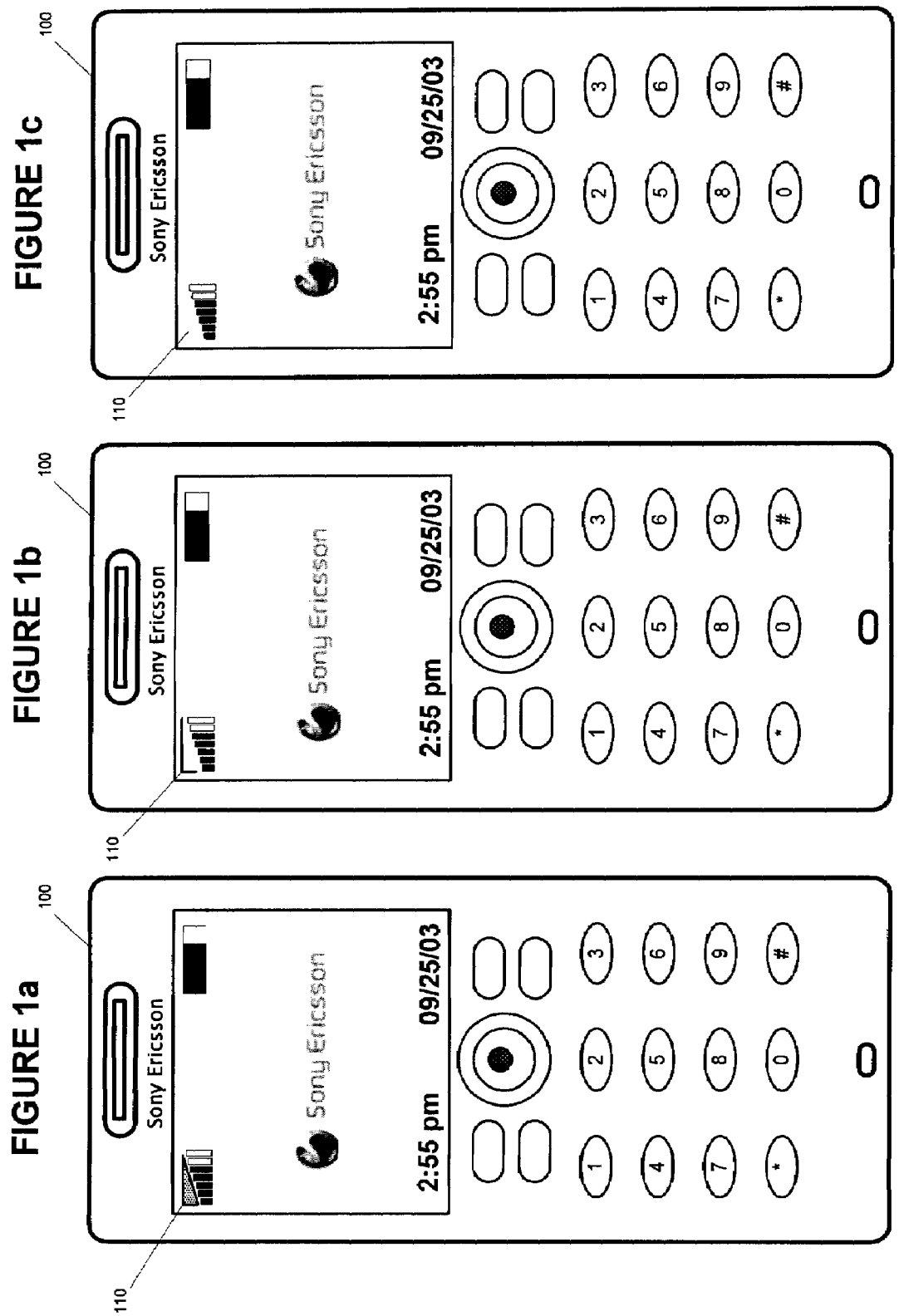
FIGS. 1a–1c illustrate a typical mobile phone highlighting the GPRS/EDGE signal indicator.

FIGS. 1a–1c illustrate a typical mobile phone 100. Mobile phone 100 is shown having a display along with a keypad for entering data into the mobile phone. The display in this instance reserves the upper left corner 110 to illustrate signal strength to the user. The series of bars represent the signal strength for voice services. This informs the user whether or not there is sufficient signal strength between the mobile station and the network for a voice call to be connected. The space above the series of bars is reserved for an icon that represents a data signal connection status.

In FIG. 1a, the data signal connection icon 110 is illustrated as a shaded triangle. For purposes of the present invention, this indicates that the mobile station currently has a GPRS/EDGE connection with the network. In FIG. 1b, the data signal connection icon 110 is illustrated as an unshaded outline. This indicates that the mobile station currently does not have a GPRS/EDGE connection with the network but that one is available if the user manually initiates a connection. In FIG. 1c, the data signal connection icon 110 is completely blank. This indicates that the mobile station currently does not have a GPRS/EDGE connection with the network and that one is unavailable at this time.

Figure 2:
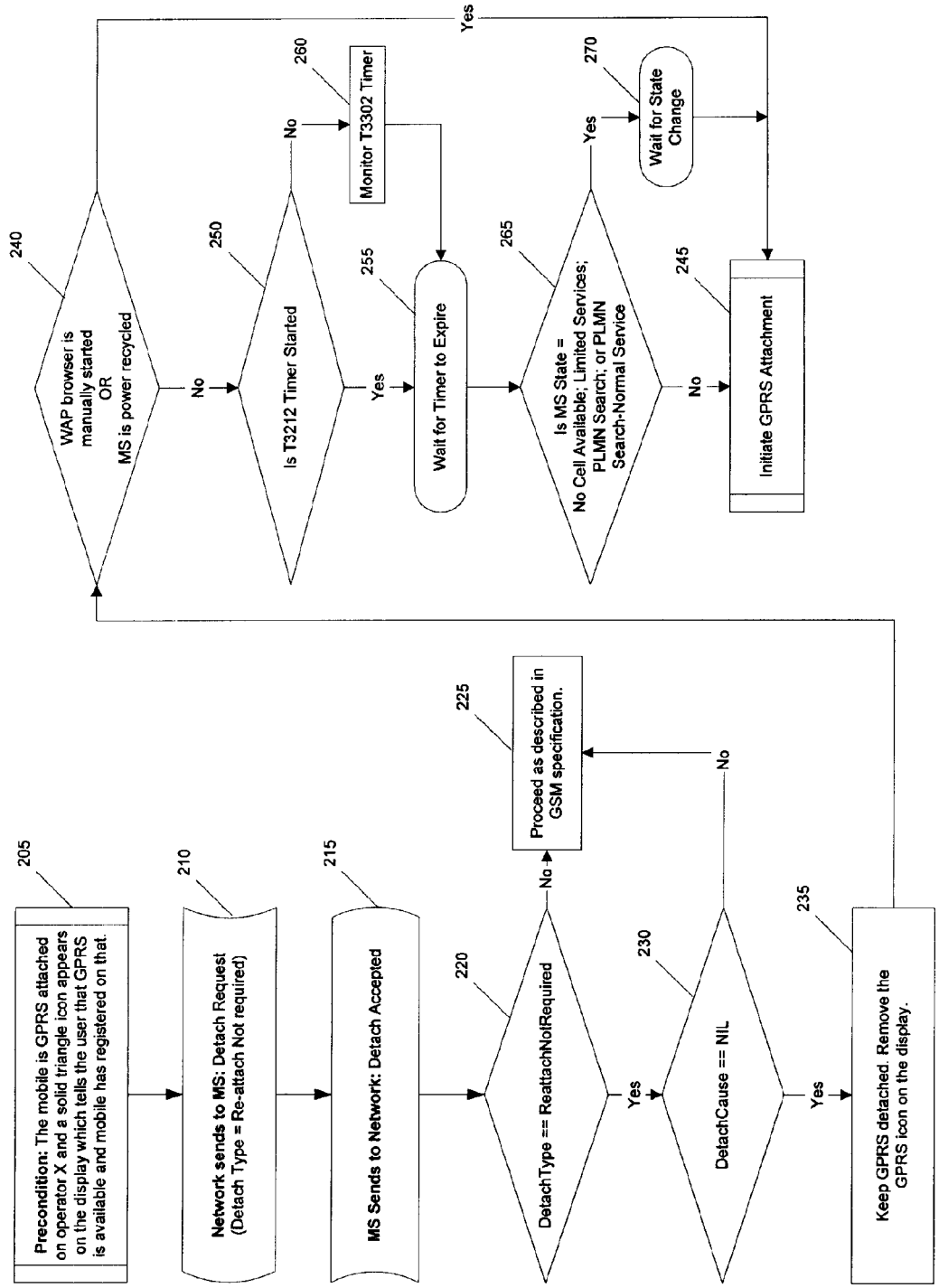
FIG. 2 illustrates a flowchart describing the present invention.

FIG. 2 is a flowchart illustrating the present invention. The present invention operates within the GSM/GPRS/EDGE standards. As such, there is a pre-condition 205 that triggers the procedures of the present invention. The present invention operates when the mobile station is initially GPRS/EDGE attached and registered on a network with a service provider. The mobile station receives a detach request from the network 210 for some unknown or non-enumerated reason. The mobile station carries out the network instruction and proceeds to detach the GPRS/EDGE service from the network. The mobile station then sends a detach_accepted message to the network 215. The mobile station parses the detach_request instruction to determine whether reattachment is required 220 and the reason for detachment 230. If the detach_type is not set such that reattachment is not required, then the mobile phone proceeds as described by the GSM/GPRS/EDGE specification 225. If the detach_type is set such that reattachment is not required, however, then the mobile phone examines the detach_cause parameter 230. If the detach_cause parameter is set to one of the enumerated values in the GSM/GPRS/EDGE specification then the mobile phone again proceeds as described by the GSM/GPRS/EDGE specification 225. In the alternative, the detach_cause parameter contains a null or NIL value. In this event, the mobile station will keep GPRS/EDGE detached and remove the GPRS/EDGE icon from the display 235.

Currently, to re-attach to a GPRS/EDGE connection, the mobile station is dependent on the user to either manually initiate a GPRS/EDGE connection by accessing the mobile station's WAP browser, or power recycle the mobile station 240. If either of these events have occurred, the mobile station will attempt to initiate a GPRS/EDGE connection 245 as per the GSM/GPRS/EDGE specification. Heretofore, if neither of these events occur, the data signal connection icon is completely blank as illustrated in FIG. 1c indicating that the mobile station currently does not have a GPRS/EDGE connection with the network and that one is unavailable at this time. The mobile station likely received the original detach_request for an unknown reason that has not been specifically enumerated in the GSM/GPRS/EDGE specification.

Up to this point, the mobile station has merely been following the procedures set out by the GSM/GPRS/EDGE specifications. The present invention has added procedures to address the situation of automatically re-attaching GPRS/EDGE when the WAP browser has not been manually initiated or the mobile station has not been power recycled.

The mobile station determines if GPRS/EDGE is currently available by listening for the SI13/PSI13 (Packet System Information 13) signal emitted by the network. If so, the mobile station implements a timeout procedure such that when the timeout period expires, the mobile station will automatically attempt to re-attach the GPRS/EDGE connection with the network. In one embodiment of the invention, the mobile station utilizes two existing timeout parameters defined in the GSM specification. This has the advantage of not having to create a new timer mechanism to be implemented in the mobile station (though a new timer mechanism could be implemented if desired).

The mobile station first detects if the T3212 timer is started 250. T3212 is part of a location based service implemented in the GSM specification. As per the GSM specification, the T3212 timeout value is broadcast by the network in an L3-RRC SYSTEM INFORMATION TYPE 3 message on the Broadcast Control Channel (BCCH). In the Universal Mobile Telecommunications System (UMTS) specification, the T3212 timeout value is broadcast by the network in an L3-RRC SYSTEM INFORMATION BLOCK 1 message on the BCCH. If the BCCH for either GSM or UMTS, indicates that periodic location shall not be used then T3212 will not be started. If the T3212 timer is not started the mobile station will alternatively monitor the T3302 timer 260. The T3302 timer is normally started because of an attach failure, a routing area updating failure, or when the attempt counter is greater than or equal to 5. The default timeout value for the T3302 timer is 12 minutes unless the network provides another value in a Global Multi-media Mobility (GMM) signaling procedure.

Either way, the mobile station then waits for whichever timer is being used to expire 255. Upon timer expiration, the mobile station determines its current state 265. If its current state is either, No Cell Available, Limited Services, PLMN Search, or PLMN Search-Normal Service, then the mobile station will wait for the state to change 270 before automatically initiating a GPRS/EDGE re-attachment 245. If the mobile station's current state is not one of those listed above, then it will attempt to automatically initiate a GPRS/EDGE re-attachment 245 immediately.

Mobile station handsets that implement the present invention can enhance both user and service provider (carrier) satisfaction. The user does not need to be directly involved in monitoring his data connections. The service provider will better be able to route data over the most appropriate system helping keep the primary voice network free to be utilized by voice calls to the greatest extent possible. Keeping an active and open GPRS/EDGE channel ensures that data services such as SMS, MMS, WAP browsing, e-mail, etc. remain on the proper systems rather than default to the core GSM voice network Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

What is claimed is:

1. A method of automatically re-establishing a GPRS/EDGE connection between a mobile station and a network comprising: in the mobile station:
   receiving a detach request from the network to terminate a current GPRS/EDGE connection between the mobile station and the network; terminating the current GPRS/EDGE connection between the mobile station and the network; determining if a detach type parameter associated with the network detach request is set to re-attach not required; if the detach type parameter associated with the detach request is set to re-attach not required, and the detach cause parameter associated with the detach request does contain a null value, then monitoring a timeout parameter; and automatically initiating a GPRS/EDGE re-attachment with the network upon expiration of the timeout parameter.

2. The method of claim 1 wherein the timeout parameter is a T3212 timeout value according to the GSM specification.

3. The method of claim 1 wherein the timeout parameter is a T3302 timeout value according to the GSM specification.

4. A computer program product resident within a mobile station for automatically re-establishing a GPRS/EDGE connection between the mobile station and a network, the computer program product comprising: computer program code for receiving a detach request from the network to terminate a current GPRS/EDGE connection between the mobile station and the network;
   computer program code for terminating the current GPRS/EDGE connection between the mobile station and the network; computer program code for determining if a detach type parameter associated with the network detach request is set to re-attach not required; if the detach type parameter associated with the detach request is set to re-attach not required, and the detach cause parameter associated with the detach request does contain a null value, then computer program code for monitoring a timeout parameter; and computer program code for automatically initiating a GPRS/EDGE re-attachment with the network upon expiration of the timeout parameter.

5. The computer program product of claim 4 wherein the timeout parameter is a T3212 timeout value according to the GSM specification.

6. The computer program product of claim 4 wherein the timeout parameter is a T3302 timeout value according to the GSM specification.

7. A system for automatically re-establishing a GPRS/EDGE connection between the mobile station and a network, the system comprising:

means for receiving a detach request from the network to terminate a current GPRS/EDGE connection between the mobile station and the network; means for terminating the current GPRS/EDGE connection between the mobile station and the network; means for determining if a detach type parameter associated with the network detach request is set to re-attach not required;

if the detach type parameter associated with the detach request is set to re-attach not required, and the detach cause parameter associated with the detach request does contain a null value, then means for monitoring a timeout parameter; and means for automatically initiating a GPRS/EDGE re-attachment with the network upon expiration of the timeout parameter.

8. The system of claim 7 wherein the timeout parameter is a T3212 timeout value according to the GSM specification.

9. The system of claim 7 wherein the timeout parameter is a T3302 timeout value according to the GSM specification.

* * * * *